May 5, 1942.   J. N. LOUGHNER ET AL   2,281,943
SLIDING FILM PROJECTOR
Filed March 11, 1940   3 Sheets-Sheet 1
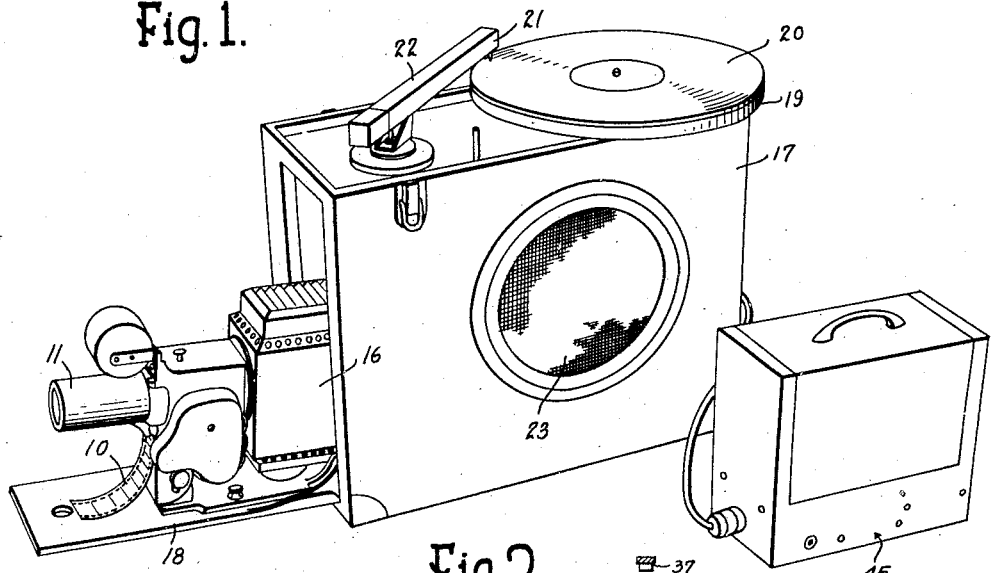
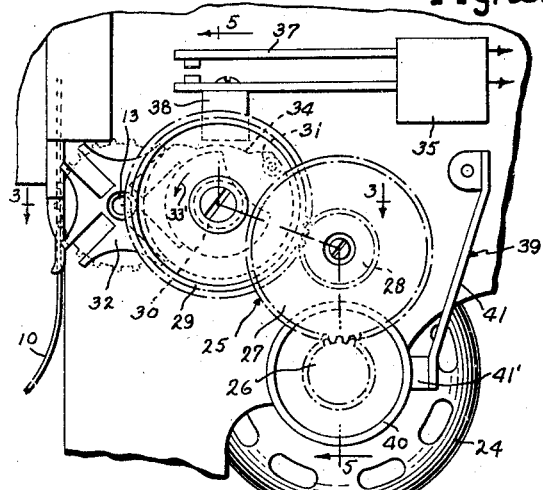
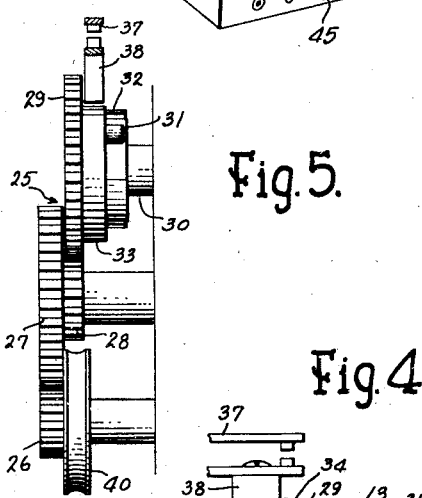
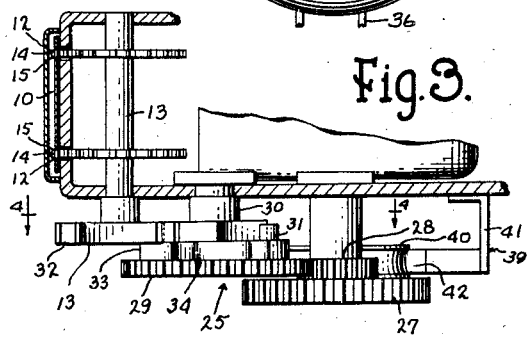
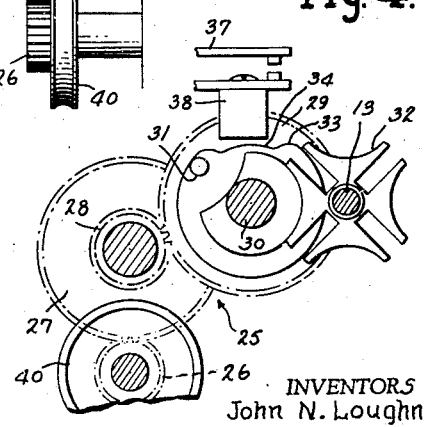
INVENTORS
John N. Loughner
Charles O. Gleason
BY Whittemore Hulbert & Belknap
ATTORNEYS INVENTORS
John N. Loughner
Charles O. Gleason

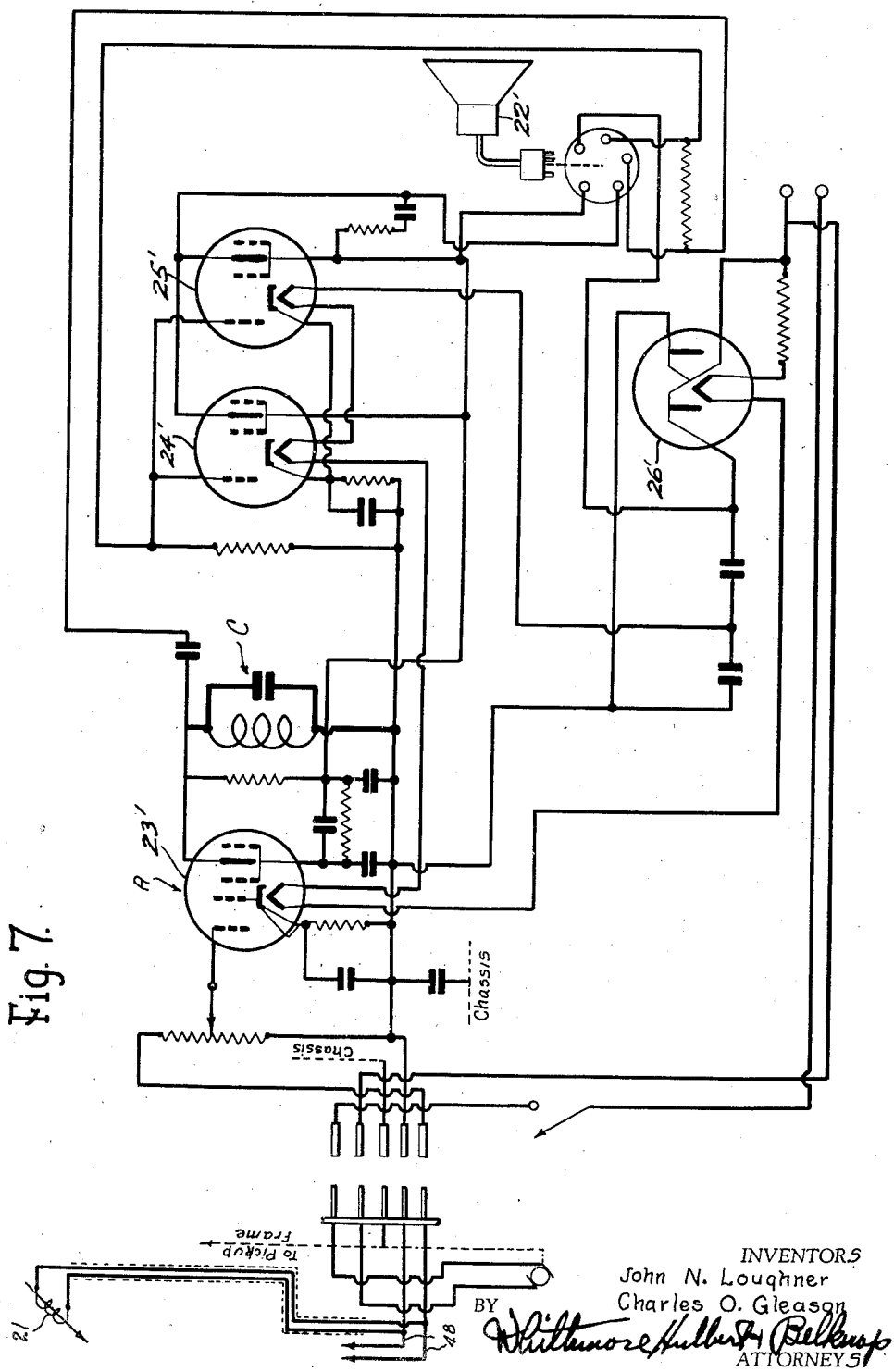

Patented May 5, 1942

2,281,943

UNITED STATES PATENT OFFICE 2,281,943

SLIDING FILM PROJECTOR

John N. Loughner, Detroit, and Charles O. Gleason, Ferndale, Mich., assignors to Jam Handy Picture Service, Inc., Detroit, Mich., a corporation of Delaware Application March 11, 1940, Serial No. 323,426

2 Claims. (Cl. 88—28)

This invention relates to sliding film projectors and refers more particularly to improvements in sound-slide film equipment.

In the commercial use of sound-slide film projectors, it has been customary to manually advance the film along the film track to successively register the frames on the film with the lens barrel in timed relation to the sound or narrator's voice recorded on the orthodox disc type record and reproduced by an electromagnetic speaker through the medium of a crystal pickup. The success of equipment of the above type depends largely on synchonizing the film with the sound which is usually in the form of a voice commenting on the scenes illustrated by the different frames of the film. In order to assist the operator in advancing the film in synchronism with the narrator's voice, the various recorded descriptions are, in effect, separated on the record by an audible note. The note acts as an audible signal to indicate the end of the description directed to the frame of the film under projection and when this signal is heard by the operator, he immediately advances the film to register the following frame with the projector lens.

One objection to the above apparatus is that the audible signal is frequently heard by the audience, as well as the operator, and distracts the attention of the audience. Another objection is that the operator frequently neglects to advance the film at the proper time and, as a result, the projected frame of the film does not correspond with the sound reproduction.

The present invention eliminates the above objections by automatically advancing the film in synchronism with the sound and accomplishes this result with a relatively simple, inexpensive apparatus capable of being readily embodied in sound-slide film projecting equipment without appreciably altering the construction of the latter. In accordance with the present invention, the notes recorded on the record are of such frequency that they do not pass through the audio amplifier of the sound recording device. These notes or signals are received in the input circuit of a suitable amplifier tuned to the particular frequency of the note and having a sensitive relay in the output circuit. The relay is energized when the signal is impressed on the input of the amplifier and closes the circuit to suitable film advancing mechanism. As a result, the film is automatically advanced at the proper period without distracting the attention of the audience and without any attention on the part of the operator.

The foregoing, as well as other objects, will be made more apparent as this description proceeds, especially when considered in connection with the accompanying drawings, wherein—

Figure 1 is a perspective view of the sound-slide film projecting unit;

Figure 2 is an elevational view of a portion of the projector shown in Figure 1 and having certain parts broken away for the sake of clearness;

Figure 3 is a sectional view taken substantially on the plane indicated by the line 3—3 of Figure 2;

Figure 4 is a sectional view taken substantially on the plane indicated by the line 4—4 of Figure 3;

Figure 5 is a sectional view taken on the plane indicated by the line 5—5 of Figure 2;

Figure 7 is a diagram of the voice amplifier.

Figure 6:
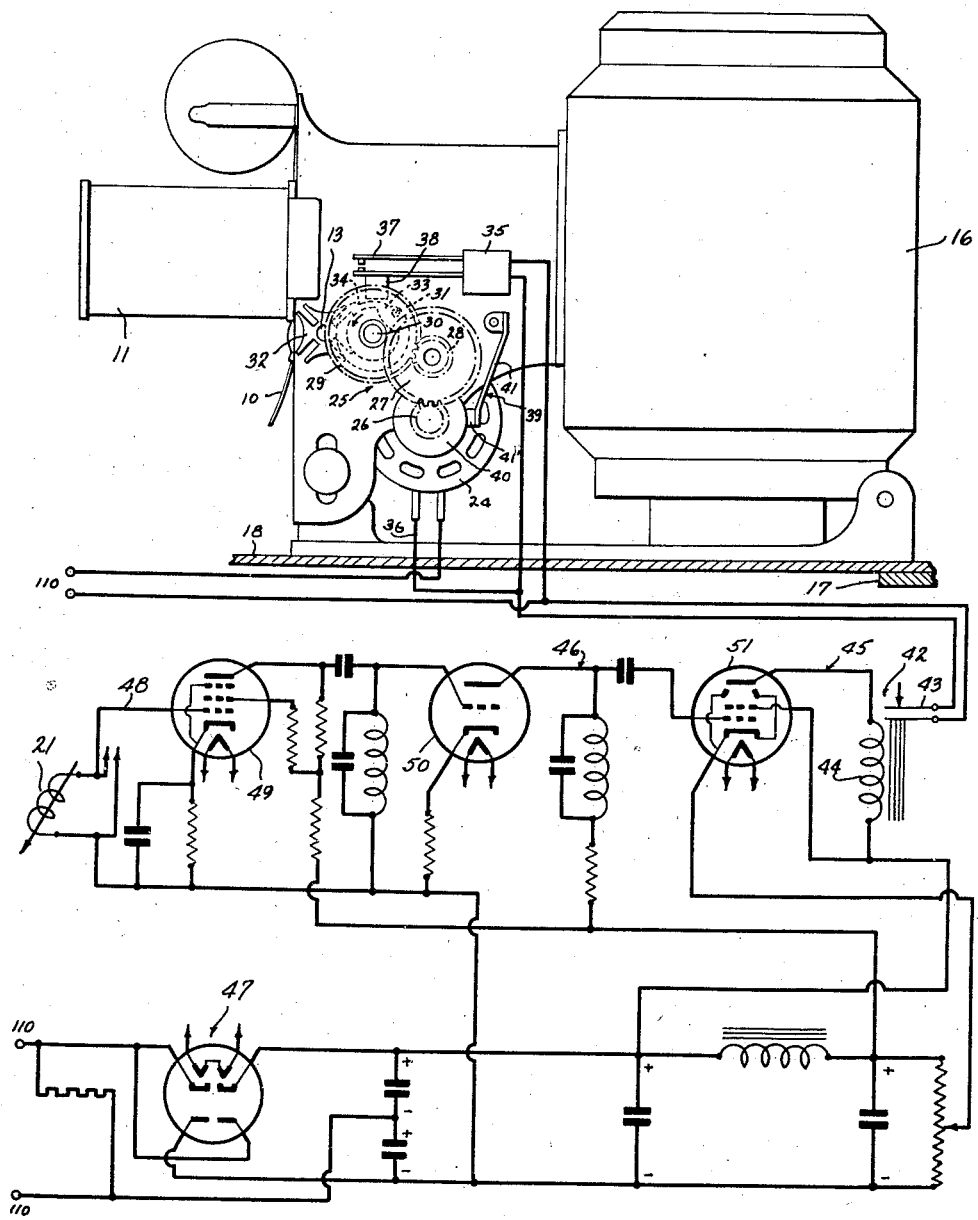
Figure 6 is a semi-diagrammatic view illustrating a sound-slide film projector constructed in accordance with the present invention.

Referring now to the drawings, it will be noted that we have illustrated in Figure 1 a sound-slide film projector having a vertical track 10 for guiding the film in operative relation to a lens barrel 11 and having means for periodically advancing the film to successively register the picture frames on the film with the rear end of the lens barrel. Upon reference to Figure 3, it will be noted that the film advancing means includes a pair of sprockets 12 mounted on a horizontal shaft 13 and having teeth 14 successively engageable in suitable slots 15 formed in the film adjacent opposite longitudinal edges of the film. A suitable source of illumination in the form of an electric light bulb (not shown) is supported within a housing 16 registering with the rear end of the lens barrel and suitable lenses (not shown) are mounted in the lens barrel 11 for projecting the picture frames of the film on a suitable screen. The parts of the projector, briefly outlined above, may be any one of the well-known accepted designs and, therefore, are not illustrated or described in detail herein.

In the embodiment selected herein for the purpose of illustrating the present invention, the above parts of the projector are adapted to be housed in a suitable casing 17 when not in use and are mounted in assembled relationship on the inner surface of a hinged closure 18 for the open front end of the casing 17. The casing 17 also supports a sound reproducing unit of the disc type in such a manner that this unit forms a compact assembly with the projecting mechanism. In general, the sound reproducing unit embodies a table 19 removably supported on the top of the casing 17 for rotation in a horizontal plane and operatively connected to a suitable electric motor (not shown) housed in the casing 17. The table 19 is adapted to support a disc type record 20 of the sound it is desired to use in conjunction with the pictures illustrated by the projecting mechanism. The sound is taken from the record 20 by means of a conventional crystal pickup 21 supported at the free end of a tone arm 22 having the opposite end suitably swivelly mounted on the top of the casing 17 in accordance with orthodox practice.

Upon reference to Figure 7, it will be noted that the crystal pickup is electrically connected in the input circuit of a suitable thermionic tube audio amplifier A housed in the casing 17 and having an electrodynamic speaker 22' in the output circuit thereof. The amplifier A shown herein comprises three thermionic amplifier tubes 23', 24' and 25'. As shown in Figure 7, the tubes are electrically connected in a circuit in such a manner as to afford three stages of amplification for the audio-frequency signal received in the input circuit by the pickup 21. In accordance with the conventional practice, a rectifier 26' is connected in the circuit to supply direct current to the heater elements in the respective tubes and to the screen grids in the latter. The electrodynamic speaker is also housed in the casing 17 and one side of the latter is open, as at 23, to permit emission of the sound. The above parts of the sound reproducing unit may also be any one of the well-known accepted designs and, therefore, are not illustrated or described in detail herein.

Although the above equipment has many and diversified uses, nevertheless, particular success has been obtained by employing the equipment for educational purposes. When used for this or a similar purpose, the record 20 is usually provided with a series of different recordings which correspond or explain the different pictures on the film. It follows, therefore, that the film must be advanced in timed relation to the record so that the two will be synchronized and the proper picture will be illustrated at the time the recording directed to this picture is reproduced.

In the use of the general type of equipment briefly outlined above, the film had to be advanced by the operator and, in order to assist the operator in properly advancing the film, a distinctly audible signal was recorded on the record between the different recordings. This audible signal has a tendency to distract the audience and, quite frequently, the operator either neglected to hear the signal or his reaction to the signal was so slow that the next recording would be under reproduction before the picture illustrating the record was projected.

According to the present invention, the film is automatically advanced to successively register the different frames with the lens barrel in proper timed relationship to the recordings on the record 20 so that advancement of the film and reproduction of the recording are in synchronism at all times. In general, the operation of the film advancing mechanism is automatically initiated by means controlled by notes or signals of predetermined audio frequency recorded on the record at predeterminedly spaced intervals. It is important to note at this time that although the signals on the record are received by the audio amplifier A, nevertheless, these signals are filtered out of this amplifier by a suitable choke C in the input circuit of the amplifier.

Referring first to the film advancing mechanism, it will be noted that this mechanism comprises an electric motor 24 having a drive shaft operatively connected to the sprocket shaft 13 through the medium of suitable reduction gearing 25. In detail, a relatively small pinion 26 is secured to the drive shaft and meshes with a larger gear 27 which, in turn, is secured to an auxiliary shaft having a relatively small pinion 28 thereon meshing with a gear 29 secured to a shaft 30. The gear 29 drives a cam 33 having a pin 31 projecting laterally therefrom adjacent the periphery and successively engageable in the radial slots of a Geneva gear 32 secured on the shaft 13. The arrangement is such that each time the gear 29 completes one revolution, the pin 31 advances the Geneva gear a distance which, in the present instance, is predetermined to move a frame on the film into registration with the lens barrel 11. In accordance with conventional practice, the Geneva gear is held from accidental rotation during the periods of rest of the film by a locking member 32' revoluble with the cam 33 and engageable with the Geneva gear 32 between the pin engaging slots in the latter.

The cam 33 controls the operation of a switch 35 electrically connected in a circuit 36 serving the motor 24 and comprising a pair of spring contact carrying fingers 37. The lower finger has a rider or follower 38 secured thereto and is adapted to be held under tension in contact with the cooperating upper finger 37 by engagement of the follower 38 with the periphery of the cam 33. As shown in Figure 4, the periphery of the cam 33 is formed with a depression 34 of such depth that when it registers with the follower 38, the lower switch contact finger 37 moves away from the cooperating upper finger 37 and opens the circuit to the motor 24. This circuit remains open until the cam 33 is rotated in the direction of the arrow 33' in Figure 2, whereupon the follower is engaged by the periphery of the cam and the lower contact finger is elevated to close the switch. The switch remains closed for practically one revolution of the cam 33 or, in other words, until the depression 34 is again registered with the follower 38. It may be pointed out at this time that the Geneva gear advancing pin 31 is so located with respect to the depression 34 in the cam 33 that the Geneva gear 32 is moved one complete step by the pin 31 to advance the film before the switch 35 is opened. In order to avoid overrunning of the motor and associated film advancing mechanism, a spring brake 39 is provided. The spring brake 39 comprises a brake drum 40 secured to the drive shaft of the motor for rotation therewith as a unit and a spring arm 41 having a pad 41' at the free end frictionally engaged with the periphery of the drum 40.

The circuit 36 to the electric motor 24 is initially closed independently of the switch 35 to effect the rotative movement of the cam 33 necessary to close the switch 35 by a sensitive relay 42. The relay 42 comprises a switch 43 connected in series with the motor circuit 36 and a load coil 44 electrically connected in the output circuit of a power pack 45. The power pack 45 comprises a thermionic tube amplifier 46 and a full-wave rectifier 47 for supplying the current to the plate circuit of the amplifier tubes. The amplifier is of a well-known design having three stages of amplification or, in other words, having three amplifier tubes. The output or plate circuit of the first tube 49 is conductively coupled to the grid of the second tube 50 and the plate circuit of the latter tube is conductively coupled to the input or grid circuit of the last tube 51. The output or plate circuit of the last tube 51 includes the load coil 44 of the sensitive relay 42 and the input circuit 48 of the first tube 49 is electrically connected to the crystal pickup 21.

The amplifier 46 is tuned to the high frequency of the notes or signals recorded on the record 20 so that each time a signal is received in the input circuit 48 of the amplifier, the load coil 44 of the relay 42 is energized. Energization of the load coil 44 causes the switch 43 to close the motor circuit 36 and thereby start the electric motor 24. Inasmuch as the cam 33 is operatively connected to the drive shaft of the motor 24, it necessarily follows that as soon as the circuit to the motor 24 is closed, the cam is rotated in the direction of the arrow 33' to a position wherein the switch 35 is closed thereby. The switch 35 shunts the switch 43 of the relay 42 and, accordingly, maintains the motor circuit closed after the switch 43 is opened by discontinuance of the signal. Also, during rotation of the cam 33 by the motor 24, the Geneva gear 32 is moved by the pin 31 to advance the next adjacent frame on the film in registration with the lens barrel. As stated above, the pin 31 is so located with respect to the depression 34 in the periphery of the cam 33 that as soon as the film has advanced, the depression 34 registers with the follower 38 on the bottom switch finger 37 and permits the latter finger to move downwardly to open the switch 35 and discontinue the operation of the motor 24. It may be pointed out at this time that the power pack 45 and associated parts may be presented in the form of a separate unit, as shown in the drawings, or may be incorporated in the casing 17.

Thus, from the foregoing, it will be observed that we have provided relatively simple, inexpensive mechanism for automatically advancing the film in timed relation to the operation of the sound reproducing unit. It will also be noted that the operation of the film advancing mechanism is controlled by the record on which the sound is recorded without employing the objectionable audible note or signal and without otherwise distracting the attention of the audience.

What we claim as our invention is:

1. In a sound-slide film projector, a lens barrel, means for supporting a film in operative relation to the lens barrel, a sound reproducing unit comprising a travelling record of the sound provided with notes in the form of signals at spaced intervals having a predetermined frequency, an amplifier tuned to the frequencies of the signals and having an input circuit receiving the signals, means for advancing the film relative to the lens barrel including an electric motor arranged in an electric circuit, a magnetically operated relay having a load coil in the output circuit of the amplifier and having a switch in the motor circuit operated by the load coil to close the motor circuit each time a signal is received by the amplifier and to open the circuit at the end of said signal, a second switch in the motor circuit shunting the relay switch, and means operated by the motor to close the second switch and to open the latter after a predetermined interval of operation of the motor.

2. In a sound-slide film projector, a lens barrel, means for advancing a film to successively register the frames with the lens barrel including an electric motor arranged in an electric circuit, a sound reproducing unit comprising a movable record of the sound having different recordings applicable to different frames on the film and having an amplifier for the sound, said record having notes recorded thereon at spaced intervals, means in the input circuit of the amplifier to filter the notes out of said amplifier, a second amplifier tuned to the frequency of the notes and having an input circuit receiving said notes, a magnetically operated relay having a load coil in the output circuit of the second amplifier and having a switch in the motor circuit operated each time the load coil is energized by a note to close the motor circuit and to open the circuit upon termination of the note, a second switch in the motor circuit shunting the first switch, and a cam driven by the motor for controlling the operation of the shunt switch.

JOHN N. LOUGHNER.
CHARLES O. GLEASON.